United States Patent [19]

Hardin et al.

[11] Patent Number: 5,074,640
[45] Date of Patent: Dec. 24, 1991

[54] CABLES WHICH INCLUDE NON-HALOGENATED PLASTIC MATERIALS

[75] Inventors: Tommy G. Hardin, Lilburn, Ga.; Warren F. Moore, Omaha, Nebr.; John J. Mottine, Jr., Omaha, Nebr.; Jeffrey D. Nielson, Omaha, Nebr.; Lloyd Shepherd, Madison, N.J.

[73] Assignee: AT&T Bell Laboratories, Murray Hill, N.J.

[21] Appl. No.: 627,281

[22] Filed: Dec. 14, 1990

[51] Int. Cl.⁵ .............................................. G02B 6/44
[52] U.S. Cl. ................................ 385/109; 174/120 R; 174/120 SR
[58] Field of Search ........................ 350/96.23, 96.34; 174/110 R, 110 N, 110 SR, 120 R, 120 SR

[56] References Cited

U.S. PATENT DOCUMENTS

| | | | |
|---|---|---|---|
| 4,374,972 | 2/1983 | Bolon et al. | 528/185 |
| 4,433,131 | 2/1984 | Bolon et al. | 528/185 |
| 4,485,127 | 11/1984 | Pauze | 427/120 |
| 4,699,461 | 10/1987 | Taylor et al. | 350/96.23 |
| 4,816,426 | 3/1989 | Bridges et al. | 437/207 |
| 4,907,855 | 3/1990 | Oestreich | 350/96.23 |
| 4,941,729 | 7/1990 | Hardin et al. | 350/96.23 |
| 4,969,706 | 11/1990 | Hardin et al. | 350/96.23 |
| 5,024,506 | 6/1991 | Hardin et al. | 350/96.23 |

OTHER PUBLICATIONS

Fairmount Chemical Co. brochure, Rev. 3/31/82, "Mixxim AO-30", 117 Blanchard st., Newark, N.J. 07105.
Ciba-Geigy brochure, "Irganox® MD-1024", Ciba-Geigy Corp., Three Skyline Dr., Hawthorne, NY 10532, 1983.

Primary Examiner—Frank Gonzalez
Attorney, Agent, or Firm—Edward Somers

[57] ABSTRACT

A cable which may be used in buildings in concealed areas such as in plenums or in riser shafts includes a core (22) which includes at least one transmission medium each of which is enclosed with a non-halogenated plastic composition of matter. The core is enclosed with a jacket (28) which also is made of a non-halogenated plastic composition. The non-halogenated plastic material of the insulation includes a polyetherimide constituent and an additive system. The additive system includes an antioxidant/thermal stabilizer and a synergistic metal deactivator and may include a lubricant. For the jacket, the plastic material is a composition which may include a siloxane/polyimide copolymer constituent blended with a polyetherimide constituent and an additive system to improve processing and long term aging, or a siloxane/polyimide copolymer constituent with a flame retardant system.

17 Claims, 3 Drawing Sheets

CABLES WHICH INCLUDE NON-HALOGENATED PLASTIC MATERIALS

TECHNICAL FIELD

This invention relates to cables which include non-halogenated plastic materials. More particularly, the invention relates to communications cables such as plenum cables, which are used in buildings and which comprise non-halogenated insulation and jacketing materials. These materials exhibit flame spread and smoke generation properties which comply with industry standards, and which exhibit low corrosivity and acceptable toxicity.

BACKGROUND OF THE INVENTION

Space between a drop ceiling in a building and a structural floor from which it is suspended serves as a return-air plenum for elements of heating and cooling systems as well as a convenient location for the installation of communications cables. The latter includes voice communications, data and signal cables for use in telephone, computer, control, alarm and related systems. It is not uncommon for these plenums to be continuous throughout the length and width of each floor.

When a fire occurs in an area between a floor and a drop ceiling, it may be contained by walls and other building elements which enclose that area. However, if and when the fire reaches the plenum, and if flammable material occupies the plenum, the fire can spread quickly throughout an entire floor of the building. The fire could travel along the length of cables which are installed in the plenum if the cables are not rated for plenum use. Also, smoke can be conveyed through the plenum to adjacent areas and to other floors.

As the temperature in a non-plenum rated cable rises, charring of the jacket material begins. Afterwards, conductor insulation inside the jacket begins to decompose and char. If the jacket char retains its integrity, it functions to insulate the core; if not, it ruptures due to either expanding insulation char or pressure of gases generated from the insulation, exposing the virgin interior of the jacket and insulation to elevated temperatures. The jacket and the insulation begin to pyrolyze and emit more flammable gases. These gases ignite and, because of air drafts within the plenum, burn beyond the area of flame impingement, propagating flame, and generating smoke and toxic and corrosive gases.

As a general rule, the National Electrical Code (NEC) requires that power-limited cables in plenums be enclosed in metal conduits. However, the NEC permits certain exceptions to this requirement provided that such cables are tested and approved by an independent testing agent, such as Underwriters Laboratories (UL), as having suitably low flame spread and smoke-producing characteristics. The flame spread and smoke production of cable are measured using UL 910, Standard Test Method for Fire and Smoke characteristics of Electrical and Optical-Fiber Cables Used in Air-Handling Spaces. See S. Kaufman "The 1987 National Electric Code Requirements for Cable" which appeared in the 1986 International Wire and Cable Symposium Proceedings beginning at page 545.

Commercially available fluorine-containing polymer materials have been accepted as the primary insulative covering for conductors and as a jacketing material for plenum cable without the use of metal conduit. However, fluoropolymer materials generate corrosive gases under combustion conditions. Also, some fluorine-containing materials have a relatively high dielectric constant which makes them unacceptable as insulation for communications conductors.

The problem of acceptable plenum cable design is complicated somewhat by a trend to the extension of the use of optical fiber transmission media from a loop to building distribution systems. Not only must the optical fiber be protected from transmission degradation, but also it has properties which differ significantly from those of copper conductors and hence requires special treatment. Light transmitting optical fibers are mechanically fragile, exhibiting low strain fracture under tensile loading and degraded light transmission when bent with a relatively low radius of curvature. The degradation in transmission which results from bending is known as microbending loss. This loss can occur because of coupling between the jacket and the core. Coupling may result because of shrinkage during cooling of the jacket and because of differential thermal contractions when the thermal properties of the jacket material differ significantly from those of the enclosed optical fibers.

The use of fluoropolymer materials for optical fiber plenum cable jackets requires special consideration of material properties such as crystallinity, and coupling between the jacket and an optical fiber core which can have detrimental effects on the optical fibers. If the jacket is coupled to the optical fiber core, the shrinkage of semi-crystalline, fluoropolymer plastic material, following extrusion, puts the optical fiber in compression and results in microbending losses in the fiber. Further, its thermal expansion coefficients relative to glass are large, thereby compromising the stability of optical performance over varying thermal operation conditions. The use of fluoropolymers also is costly and requires special care for processing.

Further, a fluoropolymer is a halogenated material. Although there exist cables which include halogen materials and which have passed the UL 910 test requirements, there has been a desire to overcome some problems which still exist with respect to the use of halogenated materials such as fluoropolymers and polyvinyl chloride (PVC). These materials, under combustion conditions, generate substantial levels of corrosive gases. Depending on the fluoropolymer used, hydrogen fluoride and hydrogen chloride can form under the influence of heat, causing corrosion and, according to some tests, increased toxicity. With PVC, only hydrogen chloride is formed.

Non-halogenated materials have been suggested for use as insulating and jacketing material for cables. See application Ser. No. 07/303,172 filed on Jan. 27, 1989 in the name of T. G. Hardin, et al. now U.S. Pat. No. 4,941,729 having issued on July 17, 1990.

A problem relating to the use of commercially available non-halogenated plastic materials has surfaced. Generally speaking, the non-halogenated materials which are available commerically are injection molding grade materials which are intended for uses in which the thickness of the molded material is substantially greater than the 5 to 15 mils that might be expected for use as conductor insulation. The melt index for the available non-halogenated materials is relatively low, being, for example in the range of 0.75 to 1.5. As is well known, melt index is indicative of the flow properties of a plastic material. The higher the melt index, the better the flow. Lower melt index materials require higher barrel extruder temperatures which could result in degradation of the plastic material. When plastic materials to be used for insulation, for example, degrade in the barrel of an extruder, acid rings, which have a propensity to cling to materials which they contact, are formed. As a result, physical properties of the insulation, such as its adhesion to an enclosed conductor, are unsatisfactory. Also, inconsistent original and post-aging physical properties are a consequence of degradation.

For jacketing, the same results have been observed. Quality controlled compositions result in better dispersion, but long term aging properties still are marginal.

What is needed is a cable which includes non-halogenated materials and which overcomes the hereinbefore discussed problems of the prior art. The sought-after cable not only exhibits suitably low flame spread and low smoke producing characteristics provided by currently used cables which include halogenated materials but also one which meets a broad range of desired properties including improved corrosivity. Such a cable does not appear to be available in the prior art. Quite succinctly, the challenge is to provide a halogen-free cable which meets the standards for plenum cables and which provides sought after properties such as suitable plastic-to-conductor adhesion and desirable physical properties which are retained post-processing. What is further sought is a cable which is characterized as having relatively low corrosion properties and acceptable toxicity, low levels of smoke generation, and one which is readily processable at reasonable cost.

SUMMARY OF THE INVENTION

The foregoing problems of the prior art have been overcome with the cables of this invention. A cable of this invention comprises a core which includes at least one transmission medium. For communications use, the transmission medium may be an optical fiber or a metallic conductor. Each transmission medium is enclosed with a non-halogenated plastic material which includes a composition comprising a polyetherimide, an antioxidant/heat stabilizer constituent, and a metal deactivator constituent. The composition may also include a suitable lubricant. A jacket encloses the core and is made of a non-halogenated plastic material which comprises preferably a siloxane/polyimide copolymer and a suitable flame retardant system.

The composition of the insulation advantageously provides at least two desirable results. First, the composition is protected during extrusion, and, as a result, during long term aging for both insulation and jacket grades of the composition. Secondly, for insulation, the degree of degradation is lessened, thereby reducing the adhesion of the plastic to an underlying metal conductor and stabilizing or improving the physical properties of the material.

Advantageously, the cables of this invention may be used in building plenums and/or rises. They meet the UL 910 test requirements for flame spread and smoke generation. Further, they exhibit acceptable toxicity and significantly lower corrosivity than prior art cables.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
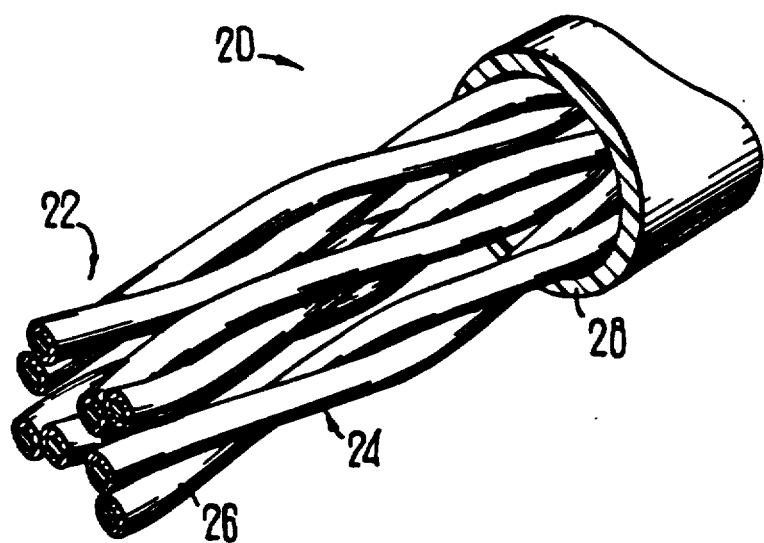
FIG. 1 is a perspective view of a cable of this invention.
Figure 2:
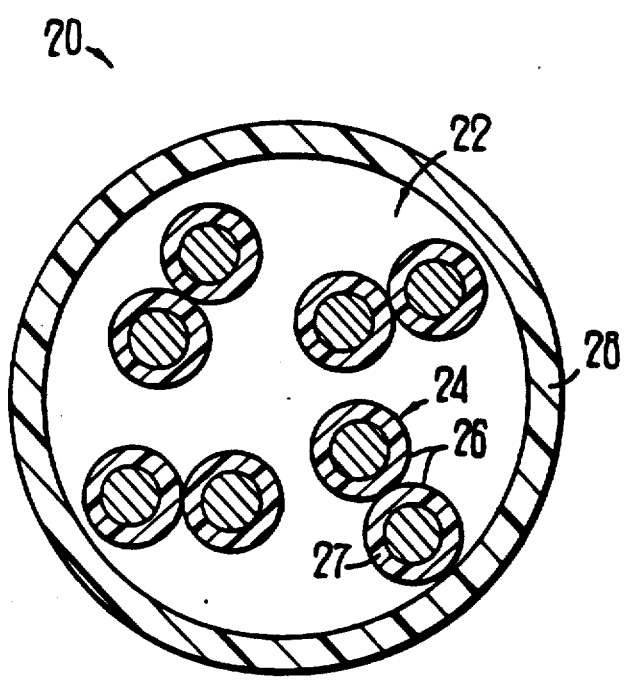
FIG. 2 is an end cross-sectional view of the cable of FIG. 1 with spacing among pairs of conductors being exaggerated.
Figure 3:
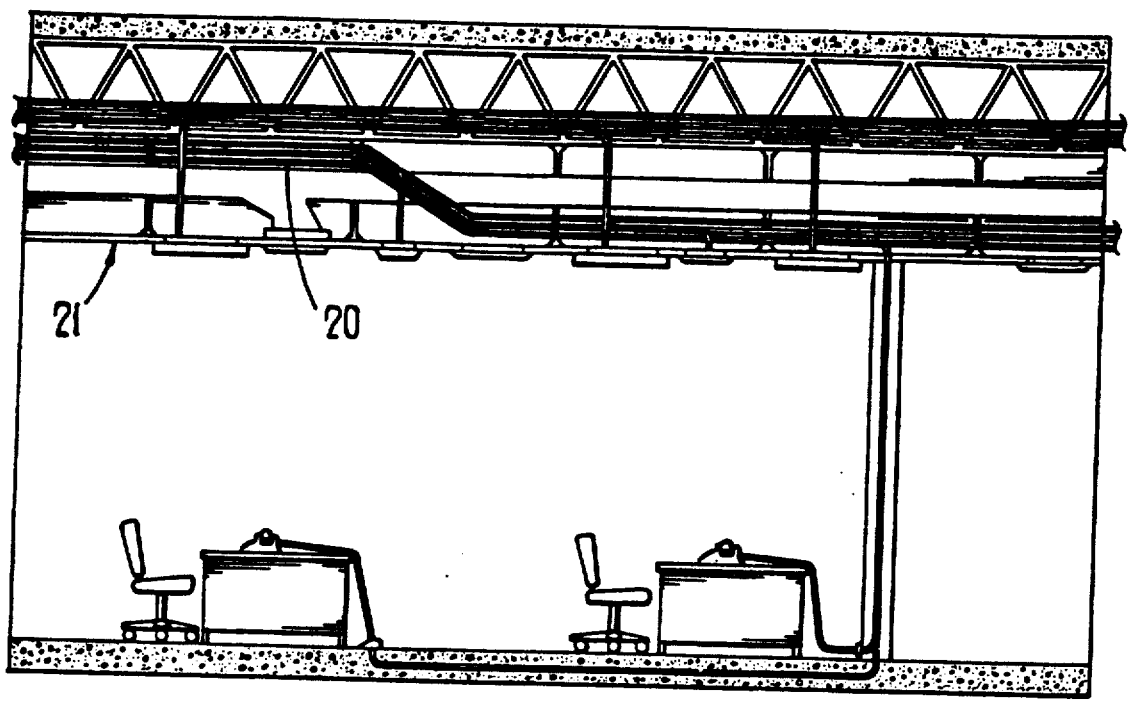
FIG. 3 is an elevational view of a portion of a building which includes a plenum, depicting the use of cables of this invention.

Referring now to FIGS. 1 and 2 there is shown a cable which is designated generally by the numeral 20 and which is capable of being used in building plenums. A typical building plenum 21 is depicted in FIG. 3. There a cable 20 of this invention is disposed in the plenum. As can be seen in FIGS. 1 and 2, the cable 20 includes a core 22 which comprises at least one transmission medium. The transmission medium may comprise metallic insulated conductors or optical fiber. The core 22 may be enclosed by a core wrap (not shown). The core 22 may be one which is suitable for use in data, computer, alarm and signaling networks as well as in voice communication.

For purposes of the description hereinafter, the transmission medium comprises twisted pairs 24—24 of insulated metallic conductors 26—26. Although some cables which are used in plenums may include twenty-five or more conductor pairs, many such cables include as few as two pairs or two single conductors.

In order to provide the cable 20 with flame retardancy, acceptable toxicity, low corrosivity and low smoke generation properties, the metallic conductors are covered with an insulation 27 comprising a plastic material which provides those properties. Each of the metallic conductors is provided with an insulation cover including a composition comprising a polyetherimide. Polyetherimide is an amorphous thermoplastic resin which is available commercially, for example, from the General Electric Company under the designation ULTEM ® resin. The resin is characterized by a relatively high deflection temperature of 200° C. at 264 psi, relatively high tensile strength and flexural modulus, and very good retention of mechanical properties at elevated temperatures. It is inherently flame resistant without the use of other constituents and has a limiting oxygen index of 47.

Polyetherimide is a polyimide having other linkages incorporated into the molecular chain to provide sufficient flexibility for melt processing. It retains the aromatic imide characteristics of excellent mechanical and thermal properties. Polyetherimide is described in an article authored by R. O. Johnson and H. S. Burlhis entitled "Polyetherimide: A New High-Performance Thermoplastic Resin" which appears beginning at page 129 in the 1983 Journal of Polymer Science.

The insulation composition comprising a polyetherimide also includes an additive system which includes an antioxidant/thermal stabilizer, and a metal deactivator. Also included in the composition of the insulation may be a suitable lubricant. The additive system may be included in a color concentrate which is added to the polyetherimide at the feed zone of an extruder. Alternatively, it may be premixed with the polyetherimide constituent.

In a preferred embodiment, the additive system includes about 0.15% by weight of an antioxidant/thermal stabilizer. It has been found that a high molecular weight hindered phenolic antioxidant/thermal stabilizer such as one available commerically from the Fairmount Chemical Company, Inc. under the trade designation Mixxim ® A0-30 is suitable. The last mentioned material has the chemical name 1,1,3-tris (2-methyl-4-hydroxy-5-tert-butylphenyl)-butane. It is a non-staining, high molecular weight hindered phenolic compound which inhibits thermo-oxidative degradation. It provides excellent protection against oxidation when used at levels of 0.02 to 1% by weight. It has a melting point in the range 185° C. to 190° C. and a molecular weight of 544. It is disclosed in a product brochure available from the Fairmount Chemical Company with a revision date of Mar. 31, 1983. Generally, its prior art use has been as an antioxidant in products that are in contact with food.

Combined with the antioxidant/thermal stabilizer is a metal deactivator in the amount of about 0.15% by weight. It has been found a high molecular weight metal deactivator is suitable for inclusion in the composition of this invention. The metal deactivator inhibits degradation caused by copper or copper oxide, thereby reducing the adhesion of the plastic insulation to the metallic conductor. More particularly, a metal deactivator with the chemical name N, N'-bis[3-(3',5-di-tert-butyl-4'-hydroxphenyl)-propanyl]hydrazine, and available from the Ciba-Geigy Company as Irganox ® MD-1024 metal deacivator, is used in the preferred embodiment.

It has been found that the elongation of the insulation 27 may be increased by including titanium dioxide in the additive system. In a preferred embodiment, the titanium dioxide is included in the amount of about 0.2 to 10% by weight.

The additive system provides a synergistic effect for the protection of the insulation 27 during processing and long-term aging. The range for each constituent of the additive system may be as high as about 1.0% by weight.

As will be recalled, the higher the melt index of the plastic material to be extruded, the better the flow properties during extrusion. Tests were run to determine the melt index of off-the-shelf polyetherimide material. At temperatures of 390° C., 340° C. and 315° C., the melt index ranges reported were 8-10, 1.5-2.5 and 0.7-1, respectively. For other materials used as insulation, the melt index is substantially higher. The melt index of Teflon ® plastic material, for example, is in the range of about 24-29.5. Advantageously, the additive package system of the composition of this invention resulted in a melt index in the range of 22-24 at 315° C. which is significantly higher than the melt index of off-the-shelf polyetherimide.

Further, the stabilizing additive system, in addition to providing protection from thermo-oxidative degradation during processing, also coats the inner surface of an extruder barrel and outer surfaces of pellets supplied to the extruder, thereby acting as a lubricant. This facilitates the use of reduced extrusion temperatures which helps to avoid degradation of the plastic material during extrusion. A 10° to 30° C. reduction in extrusion temperatures can be achieved.

It has been found that polyetherimide has a relatively strong affinity for copper. As a result, when polyetherimide insulation is extruded over a copper conductor, adhesion of the insulation to the copper may be undesirably high. This high adhesion is indicative of some degradation of the insulation.

In order to avoid this problem, the insulation 27 may comprise additional constituents. For example, a relatively small amount by weight of a siloxane/polyimide copolymer may be included in the additive system as a lubricant to improve the material processing and improve the physical properties. Siloxane/polyimide copolymer is a flame-resistant non-halogen thermoplastic material. One such material is designated SILTEM ™ copolymer and is available commercially from the General Electric Company. The siloxane/polyimide content of such a blend composition may range from 0% to 10%, with a preferred range of 0.5 to 2.0% by weight. High temperature sulfonamide plasticizers and high molecular weight stearate lubricants such as cerium stearate, have also been shown to be suitable for this application.

About the core is disposed a jacket 28. The jacket 28 is a plastic material comprising a composition which, in the preferred embodiment, includes a siloxane/polyimide copolymer and a flame-retardant system comprising about 1 to 2% by weight each of zinc borate and titantium dioxide.

The jacket 28 also may comprise a blend composition comprising about 75 to 100% by weight of a siloxane/polyimide copolymer and about 0 to 25% by weight of a polyetherimide copolymer. For relatively small cables, such as six pairs or less, for example, the jacket may comprise this last-described blend composition as well as the above-described stabilizing additive system. Also included in the blend composition of the jacket 28 may be a flame retardant system which may comprise zinc borate and/or titanium dioxide, for example. The amount of each constituent of the flame retardant system may range from 0 to 10%. Although unnecessary for relatively small pair count cables, a flame retardant system may be included in the above-identified blend composition in order to assure satisfactory fire performance for all pair sizes.

Figure 4:
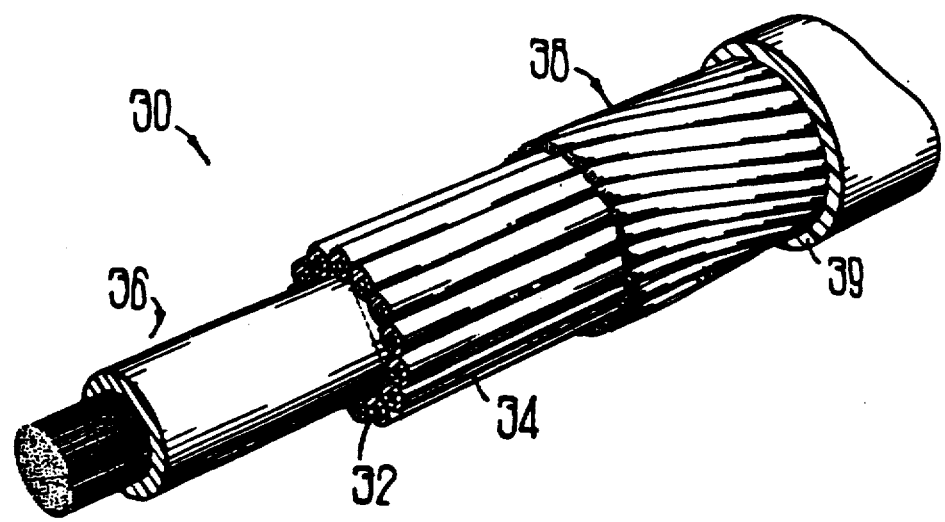
FIGS. 4 and 5 are perspective and end views of an optical fiber cable of this invention.
Figure 5:
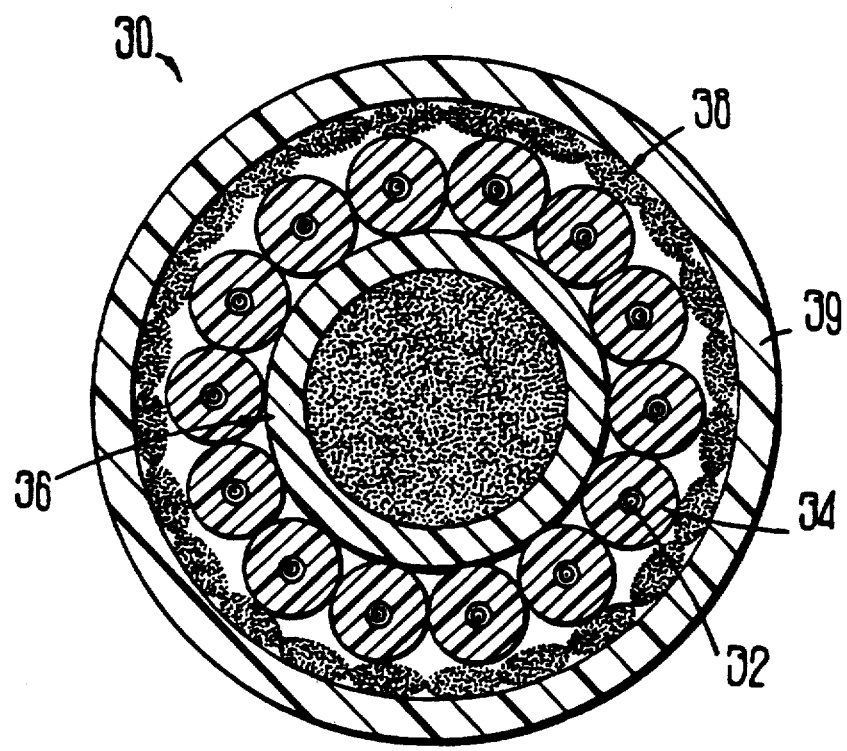

For optical fiber cables in which optical fibers are provided with a buffer layer, a siloxane/polyimide copolymer is preferred as the material for the buffer layer. The siloxane/polyimide copolymer has a lower modulus than the polyetherimide which reduces the possibility of inducing microbending loss into the optical fibers. A typical buffered optical fiber plenum cable 30 is shown in FIGS. 4 and 5. The cable 30 includes a plurality of coated optical fiber 32—32 each covered with a buffer layer 34. As is seen, the plurality of optical fibers may be disposed about a central organizer 36 and enclosed in a layer 38 of a strength material such as KEVLAR ® yarn. The strength member layer is enclosed in a jacket 39 which is a non-halogenated material which may include a polyetherimide constituent. The jacket may comprise siloxane/polyimide copolymer or a blend of a polyetherimide and a siloxane/polyimide copolymer.

In the past, the cable industry in the United States has shied away from non-halogenated materials for use in plenum cables. Those non-halogenated materials possessing desired properties seemingly were too inflexible to be used in such a product. Those non-halogenated materials which had the desired flexibility did not meet United States standards for plenum cable. What is surprising is that the transmission medium covers and cable jackets of this invention include non-halogenated materials, yet meet UL 910 test requirements.

Surprisingly, the cable of this invention which includes non-halogenated insulation and jacketing materials not only meets acceptable industry standards for flame spread and smoke generation properties, but also exhibits low corrorsivity and acceptable toxicity. The result is surprising and unexpected because it had been thought that non-halogenated materials with acceptable levels of flame spread and smoke generation were excessively rigid, and that those which had suitable flexibility would not provide flame spread and smoke generation properties which satisfy industry standards. The conductor insulation and the jacketing material of the claimed cable cooperate to provide a system which delays the transfer of heat to the transmission media. Because conductive heat transfer, which decomposes conductor insulation, is delayed, smoke emission and further flame spread are controlled.

Flame spread and smoke evolution characteristics of cables may be demonstrated by using the UL 910 test. The UL 910 test is described in the previously identified article by S. Kaufman and is a method for determining the relative flame propagation and smoke generating characteristics of cable to be installed in ducts, plenums, and other spaces used for environmental air. Tests have shown that heat is transferred to the cable core principally by thermal radiation, secondly by conduction and finally by convection.

During the UL 910 test, flame spread is observed for a predetermined time, and smoke is measured by a photocell in an exhaust duct. For a cable to be rated as plenum, i.e. type CMP, according to the National Electric Code, flame spread must not exceed five feet. A measure of smoke evolution, termed optical density, is an obscuration measurement over a length of time as measured by an optical detector. The lower the optical density, the more desirable are the smoke characteristics. A cable designated CMP must have a maximum optical density of 0.5 and an average optical density of 0.15 or less.

Toxicity characteristics of cables may be demonstrated using a test developed by the University of Pittsburgh. In this test, a parameter referred to as legal concentration, $LC_{50}$, which constitutes a mortality rate of 50% among an animal population, i.e. 2 out of 4 mice, is measured. It is important to recognize that $LC_{50}$ is measured for the plastic material used in the cable without the metallic conductors. Measured in this fashion, $LC_{50}$ is an indication of the toxicity of the smoke generated by a material during combustion. The higher the value of the $LC_{50}$, the more material that must be burned to kill the same number of test animals, and hence the lower is the toxicity. The $LC_{50}$ values for cables of this invention were higher than those for comparable cables which included halogenated materials.

Corrosivity of smoke from cables may be demonstrated by the measurement of acid gases generated during combustion of the cables. The higher the concentration of acid gas generated, the more corrosive the plastic material which encloses the transmission media. This procedure is currently used in a United States military specification for shipboard cables. According to this specification, 2% acid gas, as measured in terms of percent hydrogen chloride generated per weight of cable, is the maximum allowed. Plenum cables of this invention showed 0% generation of acid gas.

Test results for example cables of this invention, as well as for other plenum cables, are shown in the following table. Being plenum rated, the cables of the table pass the UL 910 test for flame spread and smoke generation. Example cables were subjected to test in accordance with the previously mentioned UL 910 test and exposed to temperatures of 904° C., or incident heat fluxes as high as 63 kw/m².

TABLE

| PLENUM CABLE | TYPE I | | TYPE II | | TYPE III | | TYPE IV | |
|---|---|---|---|---|---|---|---|---|
| EXAMPLE | Ex 1 | Ex 2 | Ex 1 | Ex 2 | Ex 1 | Ex 2 | Ex 1 | Ex 2 |
| PROPERTY | | | | | | | | |
| A. Smoke generation | | | | | | | | |
| max optical density | 0.28 | 0.28 | 0.19 | 0.31 | 0.17 | 0.21 | 0.47 | 0.40 |
| avg. optical density | 0.04 | 0.05 | 0.04 | 0.05 | 0.04 | 0.04 | 0.08 | 0.08 |
| B. Max Flame Spread (ft) | 3.0 | 3.0 | 3.0 | 3.0 | 4.5 | 4.0 | 4.0 | 3.0 |
| C. Outside Diameter (inch) | 0.147 | 0.170 | 0.155 | 0.155 | 0.156 | 0.157 | 0.36 | 0.36 |
| D. Jacket thickness (inch) | 0.010 | 0.010 | 0.010 | 0.010 | 0.010 | 0.010 | 0.10 | 0.10 |

The table discloses plenum burn data which demonstrate that the cables of this invention, which include non-halogenated plastic materials, resist flame spread and exhibit smoke generation. Two examples of each type cable were subjected to the UL910 test for telecommunication cables.

Type I cable included copper conductors insulated with a compositio comprising 98.7% by weight polyetherimide, 0.65% by weight of a metal deactivator such as Irganox MD-1024, marketed by Ciba-Geigy Company, and 0.65% by weight of an antioxidant/thermal stabilizer such as Mixxim ® AO-30 marketed by Fairmount Chemicals. The jacket comprised a blend composition of 75% by weight of a siloxane/polyimide copolymer and 25% by weight of a polyetherimide, both of which are marketed by the General Electric Plastics Company.

Type II was comprised of the same insulation as Type I together with a coating of ink for color coding the conductor. The ink used was product code 3600.901, available from the Gem Gravure Company. The jacket comprised the same material as that of Type I.

Type III was comprised of eight copper conductors each insulated with 100% by weight polyetherimide. The jacket comprised 97% by weight of siloxane/polyimide copolymer, 2% by weight of titanium dioxide, ½% by weight of Irganox MD-1024 metal deactivator, and ½% by weight of Mixxim ® AO-30 antioxidant/thermal stabilizer.

Type IV was comprised of fifty copper conductors each insulated with a polyetherimide composition which in some instances included the additive package. The jacket was a composition comprising 98% by weight of siloxane/polyimide, 1% titanium dioxide and 1% zinc borate.

Physical data for the characteristics of adhesion, elongation and tensile strength have been obtained. These characteristics describe the physical performance of the insulation, important for installation and termination of the completed cable. The material additives of the insulation and jacket compositions of the cables of this invention improve the product by lowering the adhesion and increasing the elongation. The insulation adhesion was reduced from about 5–10 pounds/inch to about 1.5–4 pounds/inch and the elongation at break was increased from about 70–106% to about 90–110%. For insulation which included titanium dioxide, the elongation was increased still further. Thermal stability is enhanced, as demonstrated by consistent aging characteristics.

The cables of this invention include transmission media covers and jackets which have a range of thickness. But in each case, the cable passes the flame spread and smoke evolution requirements of the UL 910 test. They also provide low corrosivity and acceptable toxicity.

The sheath system of cables of this invention (a) delays the transfer of conducted heat to the core 22 which produces less insulation pyrolysis, which in turn produces less smoke and thereof less flame spread; (b) effectively reflects the radiant energy present throughout the length of the UL 910 test; (c) eliminates premature ignition at any overlapped seams; and (d) allows the insulation to char fully, thereby blocking convective gas flow along the cable length. Further, it provides low corrosivity and acceptable toxicity.

It is to be understood that the above-described arrangements are simply illustrative of the invention. Other arrangements may be devised by those skilled in the art which will embody the principles of the invention and fall within the spirit and scope thereof.

We claim:

1. A communication cable, which comprises:
   a core which comprises at least one communications transmission medium, said communications transmisson medium having disposed thereabout a plastic material which is composition of matter including a polyetherimide and an additive system which comprises an antioxidant/thermal stabilizer and a metal deactivator; and
   a jacket which encloses said core and which comprises a plastic material.

2. The cable of claim 1, wherein said additive system comprises about 0.05 to 1% by weight of an antioxidant/thermal stabilizer.

3. The cable of claim 1, wherein said additive system comprises about 0.05 to 1% by weight of a metal deactivator.

4. The cable of claim 1 wherein said plastic material of said jacket comprises a blend composition of a polyetherimide and a siloxane-polyimide copolymer and further comprising said additive system.

5. The cable of claim 4, wherein said blend composition of said jacket includes about 25% by weight of a polyetherimide and about 75% by weight of a siloxane/polyimide copolymer.

6. The cable of claim 1, wherein said jacket comprises a blend composition which includes a siloxane/polyimide copolymer and a flame retardant system.

7. The cable of claim 6, wherein said flame retardant system includes zinc borate and titanium dioxide.

8. The cable of claim 7, wherein said flame retardant system includes about 1% by weight of titanium dioxide and about 1% by weight of zinc borate.

9. The cable of claim 1, wherein said plastic material which is disposed about each said transmission medium also includes a suitable lubricant.

10. The cable of claim 1, wherein said additive system includes a compatible plastic material which provides overall polymer lubricity.

11. The cable of claim 10, wherein said compatible plastic material comprises a siloxane/polyimide copolymer.

12. The cable of claim 1, wherein said additive system includes a lubricant having a relatively high melting point.

13. The cable of claim 12, wherein said lubricant comprises cerium sterate.

14. The cable of claim 1, wherein said additive system includes a plasticizer having relatively high thermal stability.

15. The cable of claim 14, wherein said plasticizer comprises a relatively high molecular weight sulfonamide.

16. The cable of claim 1, wherein said core comprises at least one optical fiber and said plastic material which encloses said optical fiber is a buffer layer comprising a siloxane/polyimide copolymer.

17. The cable of claim 1, wherein said additive system includes about 0.2 to 10% by weight of titanium dioxide.

* * * * *